Oct. 17, 1961     D. J. PEPPER ET AL     3,004,328
FIN AND TUBE ASSEMBLY AND METHOD OF BONDING SAME
Filed Feb. 29, 1956

INVENTOR.
DONALD JOHN PEPPER
ALBERT JOHN MILES
BY
ATTORNEY

United States Patent Office 3,004,328
Patented Oct. 17, 1961

3,004,328
FIN AND TUBE ASSEMBLY AND METHOD
OF BONDING SAME
Donald John Pepper, Kingswood, and Albert John Miles, Ashford, England, assignors to Foster Wheeler Corporation, New York, N.Y., a corporation of New York
Filed Feb. 29, 1956, Ser. No. 568,624
2 Claims. (Cl. 29—157.3)

This invention relates to extended surface element and tube assemblies, such as are used in heat exchange apparatus and the like, and method of bonding the extended surface elements to the tube.

The efficiency of a heat exchange apparatus, employing tubes to which are secured a plurality of spaced extended surface elements or fins, is largely dependent upon the rate of heat conductivity between the fins and the tubes. Where the fins are metallically bonded to the tubes, as by welding, brazing or the like, it is essential that the metallic bonds provide a substantially uninterrupted metallic contact between the fins and the tubes in order to provide a high heat conductive path across the joint between the fins and tubes.

Accordingly, it is an object of the present invention to provide a method of bonding fins to tubes whereby a high heat conductive path is provided between the fins and the tubes. Another object of this invention is to provide a fin and tube assembly which resists deformation.

In accordance with this invention, therefore, a novel fin and tube assembly and method of bonding the spaced fins to the tube is provided wherein the fins are each provided with an opening therein adapted to receive the tube therethrough and provide a clearance between the fin and tube of approximately 0.005 of an inch. An annular spacing member, having a central bore adapted to receive the tube therethrough and to provide a clearance of 0.005 of an inch between the tube and the surface of the bore, is disposed between each pair of fins to reinforce the tube and to maintain the fins in spaced relationship with each other. The annular spacing members are each provided with at least one annular recess in the surface of the bore thereof, which recess is adapted to receive suitable brazing material. The contacting surfaces of the spacing members, tube and fins are coated with brazing flux and the tubes, fins and spacing members are assembled, with the recess of each spacing member having brazing material inserted therein. The entire assembly is then heated to a proper brazing temperature which causes the brazing material to melt and flow into the spaces between the spacing member and the tube, between the fins and tube, and into any spaces which remain between the spacing members and their adjacent fins after the fins and spacing members are pressed together. The assembly is then cooled to solidify the brazing material whereby a substantially uninterrupted metallic bond is provided between the fins and the tubes.

The invention will be more fully understood from the following detailed description thereof when considered with the accompanying drawing wherein several embodiments of the invention are illustrated by way of example and in which.

Like characters of reference refer to the same or similar parts in the various figures.

Figure 1:
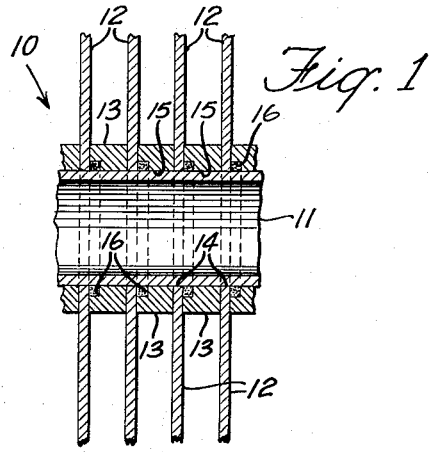
FIG. 1 is a longitudinal section of a fin and tube assembly according to the present invention.

Referring to the drawing and more particularly to FIG. 1, 10 generally designates a fin and tube assembly which comprises a tube 11 to which is metallically bonded a plurality of radial fins 12 and cylindrical spacing members 13, a spacing member 13 being disposed between each pair of fins 12. Fins 12 are provided with circular holes 14, through which tube 11 extends, which have a diameter slightly larger than the outside diameter of tube 11 to provide a clearance between the fin and the outer surface of tube 11 of approximately 0.005 inch. Spacing members 13 are each provided with a central bore 15 adapted to receive tube 10 therethrough. Each of the bores 15 has a diameter slightly larger than the outside diameter of tube 10 so that a clearance of approximately 0.005 inch is provided between the tube and the surface of bore 15. Each spacing member has an annular recess 16 disposed in one end face thereof at the periphery of bore 15. The recesses 15 are dimensioned so as to provide a receptacle for a sufficient quantity of brazing metal, such as silver solder, or the like, by which the fins 12, spacing members 13 and tube 11 are metallically bonded together, as hereinafter described.

In the assembly of fin and tube assembly 10, aforedescribed, tube 11 is passed alternately through holes 14 of fins 12 and bores 15 of spacing members 13 so that each fin 12 is spaced from an adjacent fin by a spacing member 13. Each spacing member 13 is positioned on tube 11 so that recess 16 of each spacing member 13 is closed by a different fin 12. Before assembly or as the assembly progresses, the outer surface of tube 11, the surface of bores 15 and the surface of the fins 12, adjacent the periphery of holes 14, are coated with a suitable brazing flux and brazing metal, which metal may be in the form of wire, is placed within recess 15 of each spacing member 13. After the assembly is completed, fins 12 and spacing members 13 are pressed tightly together. Thereafter, the entire assembly is heated to an appropriate brazing temperature which is lower than the melting point of the material of which tube 11, fins 12 and spacing members 13 are made. For example, if tube 11 is of mild steel, and spacing members 13 are of brass and the fins 12 are of copper, the brazing metal employed may be silver solder which has a lower melting point than the aforesaid metals of which the tube, fins and spacing members are made. Since a clearance between fins 12 and tube 11, and a clearance between spacing members 13 and tube 11, is provided of approximately 0.005 of an inch, the melted brazing metal readily flows into the spaces between fins 12 and tube 11 and the surface of bores 15 and tube 11. The assembly is then allowed to cool and, when the brazing metal solidifies, a substantially uninterrupted bond is provided between tube 11 and fins 12 and spacing members 13. If in the fin and tube assembly 10, a space of .005 inch or less remains between the end face of a spacing member 13 and adjacent fin 12 after fins 12 and spacing members 13 are pressed together, the liquid brazing metal will flow into the space to provide a metallic bond between the spacing member and the fin.

The spacing members 13 are each provided with a body portion between the surface of bore 15 and the outer surface thereof which is substantially thicker than the wall of tube 11 whereby tube 11 is reinforced and a fin and tube assembly is provided which effectively resists deformation due to differential expansion to which the assembly, in use, may be subjected.

Figure 2:
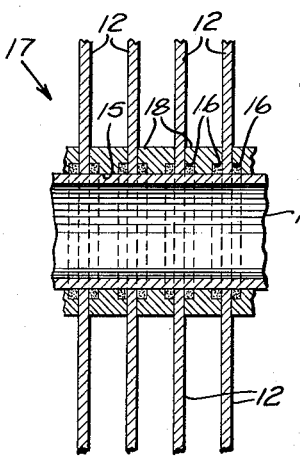
FIG. 2 is a view, similar to FIG. 1, showing a fin and tube assembly according to a second embodiment of this invention.

In FIGURE 2 is shown a fin and tube assembly 17, constituting a second embodiment of this invention, which differs from the embodiment shown in FIG. 1 in that spacing members 18, similar to spacing members 13, are each provided with an annular recess 16 disposed in both end faces at the periphery of bore 15. Brazing metal is placed in both recesses 16 of each spacing member 18 and the method of assembly and bonding fins 12, spacing members 18 and tube 11 together is accomplished in the same manner as described in the embodiment shown in FIG. 1.

Figure 3:
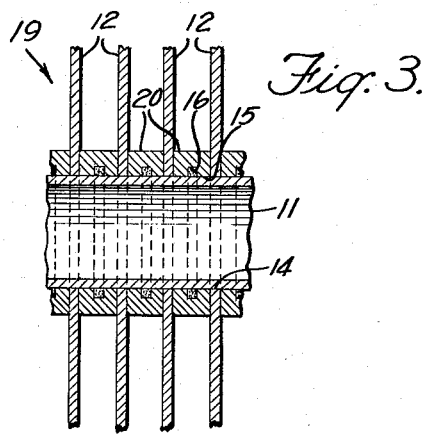
FIG. 3 is a view, similar to FIGS. 1 and 2, showing a third embodiment of this invention.
Figure 4:
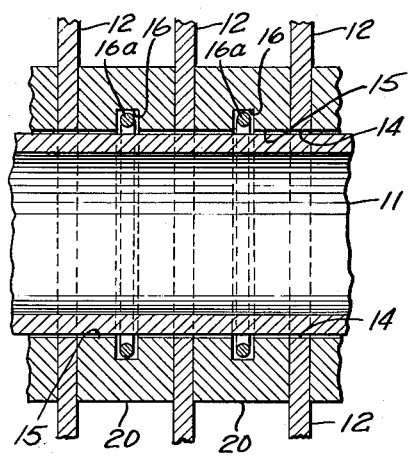
FIG. 4 is an enlarged fragmentary view of the embodiment shown in FIG. 3 before the bonding of the fins to the tube.

In FIGS. 3 and 4 is shown a fin and tube assembly 19, constituting a third embodiment of this invention, which differs from the embodiments shown in FIGS. 1 and 2 in that spacing members 20, similar to spacing members 13 and 18, are each provided with an annular recess 16 in the surface of bores 15 disposed midway between the opposite end faces of each spacing member 20.

Brazing metal may be in the form of a circlet of wire 16a and sprung within recesses 16, as shown in FIG. 4. The assembly and bonding of the fins 12, spacing members 20 and tube 11 together is accomplished in the same manner as previously described.

Figure 5:
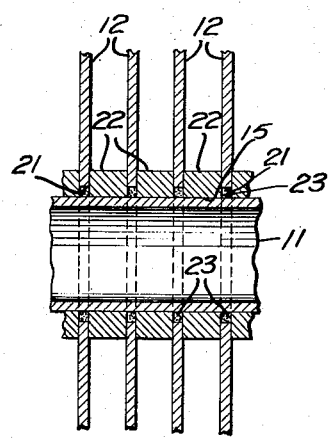
FIG. 5 is a view, similar to FIGS. 1, 2 and 3, illustrating a fin and tube assembly in accordance with a fourth embodiment of the present invention.

In FIG. 5 is shown a fourth embodiment of this invention which is particularly applicable to a fin and tube assembly wherein fins 12 are made of material which cannot be directly brazed to the metal of which tube 11 is made. In this embodiment, fins 12 are provided with holes 21 which have a diameter substantially larger than the outside diameter of tube 11 to thereby provide a relatively large clearance between fins 12 and tube 11. A spacing member 22, similar to spacing members 13, 18 and 20, but not having a recess 16 therein, is disposed between each pair of fins 12. A cavity 23 is formed adjacent each fin by reason of the large clearance between fins 12 and tube 11, which cavity is defined by the peripheral surface of hole 21 and the outer surface of tube 11 and the end faces of spacing members 13 which abut each side of fin 12. A sufficient quantity of brazing metal is placed in each cavity 23, and the contacting surfaces of the fins 12, spacing members 22 and tube 11 are coated with brazing flux, as fins 12 and spacing members 22 are assembled on tube 11. The entire assembly is heated, as in the other embodiments, to the proper brazing temperature and then cooled to metallically bond spacing members 22 to tube 11 and to fins 12, the spacing members serving as a heat condcutive medium between tube 11 and fins 12.

Although several embodiments of the invention have been illustrated and described in detail, it is to be expressly understood that the invention is not limited thereto. Various changes can be made in the arrangement of parts and method steps without departing from the spirit and scope of the invention, as the same will now be understood by those skilled in the art.

What is claimed is:

1. A method of metallically bonding fins to a tube wherein said fins are spaced from each other by a spacer member, said method comprising the steps of providing holes in each of the fins of a diameter slightly larger than the outside diameter of the tube so that a space is defined between the periphery of the hole in the fin and the outer surface of the tube when the fin is disposed on the latter, providing a bore through each spacer member of a diameter slightly larger than the outer diameter of the tube so that a space is defined between the surface of said bore and the outer surface of the tube when the spacer member is placed on the latter, providing an annular recess in the surface of the bore of each of said spacer members inwardly of the ends of said spacer member, inserting brazing material in each of said annular recesses of said spacer members, placing the fins and spacer members in alternate relationship with each other on said tube, pressing the fins and spacer members together, heating the entire assembly to the melting point of the brazing material whereby some of the brazing material flows from the recesses into the spaces defined by the surfaces of the bores of said spacer members and the outer surface of the tube and the surfaces of the holes of the fins and the outer surfaces of the tube, and allowing the assembly to cool to solidify the brazing material and bond the fins, spacer member and tube together.

2. A method of metallically bonding fins to a tube wherein said fins are spaced from each other by a spacer member, said method comprising the steps of providing holes in each of the fins of a diameter slightly larger than the outside diameter of the tube so that a space is defined between the periphery of the hole in the fin and the outer surface of the tube when the fin is disposed on the latter, providing a bore through each spacer member of a diameter slightly larger than the outer diameter of the tube so that a space is defined between the surface of said bore and the outer surface of the tube when the spacer member is placed on the latter, providing an annular recess in the surface of the bore of each of said spacer members midway between the ends of said spacer member, inserting brazing material in each of said annular recesses of said spacer members, placing the fins and spacer members in alternate relationship with each other on said tube, pressing the fins and spacer members together, heating the entire assembly to the melting point of the brazing material whereby some of the brazing material flows from the recesses into the spaces defined by the surfaces of the bores of said spacer members and the outer surface of the tube and the surfaces of the holes of the fins and the outer surfaces of the tube, and allowing the assembly to cool to solidify the brazing material and bond the fins, spacer member and tube together.

References Cited in the file of this patent

UNITED STATES PATENTS

| 1,630,749 | Kjerner | May 31, 1927 |
| 1,720,034 | Langensiepen | July 9, 1929 |
| 1,788,474 | Trane | Jan. 13, 1931 |
| 1,865,051 | Trane | June 28, 1932 |
| 1,997,373 | McCormick | Apr. 9, 1935 |
| 2,070,539 | Muhleisen | Feb. 9, 1937 |
| 2,161,898 | Ledbetter | June 13, 1939 |
| 2,182,238 | Rasmussen | Dec. 5, 1939 |
| 2,329,944 | Schakenbach | Sept. 21, 1943 |
| 2,576,085 | Vivian | Nov. 20, 1951 |

FOREIGN PATENTS

| 94,471 | Austria | Oct. 10, 1923 |
| 304,892 | Great Britain | Jan. 31, 1929 |